United States Patent [19]
Levoy et al.

[11] Patent Number: 6,097,394
[45] Date of Patent: Aug. 1, 2000

[54] METHOD AND SYSTEM FOR LIGHT FIELD RENDERING

[75] Inventors: Marc Levoy, Stanford; Pat Hanrahan, Portola Valley, both of Calif.

[73] Assignee: Board of Trustees, Leland Stanford, Jr. University, Palo Alto, Calif.

[21] Appl. No.: 08/848,569

[22] Filed: Apr. 28, 1997

Related U.S. Application Data

[60] Provisional application No. 60/016,511, Apr. 30, 1996.

[51] Int. Cl.⁷ .................................................. G06T 15/00
[52] U.S. Cl. ......................... 345/419; 345/427; 345/426; 382/154
[58] Field of Search ..................................... 345/419, 426, 345/475, 427

[56] References Cited

U.S. PATENT DOCUMENTS

| | | | |
|---|---|---|---|
| 5,166,783 | 11/1992 | Hodgson | 348/104 |
| 5,231,485 | 7/1993 | Israelsen et al. | 348/405 |
| 5,253,036 | 10/1993 | Ashdown | 356/121 |
| 5,396,583 | 3/1995 | Chen et al. | 345/427 |
| 5,398,069 | 3/1995 | Huang et al. | 348/422 |
| 5,559,334 | 9/1996 | Gupta et al. | 250/360.1 |
| 5,561,464 | 10/1996 | Park | 348/397 |
| 5,579,456 | 11/1996 | Cosman | 345/428 |
| 5,594,845 | 1/1997 | Florent et al. | 345/427 |
| 5,613,048 | 3/1997 | Chen et al. | 345/419 |
| 5,684,935 | 11/1997 | Demesa, III et al. | 345/419 |
| 5,710,875 | 1/1998 | Harashima et al. | 345/419 |
| 6,009,188 | 12/1999 | Cohen et al. | 382/154 |
| 6,023,523 | 2/2000 | Cohen et al. | 382/154 |
| 6,028,955 | 2/2000 | Cohen et al. | 382/154 |

OTHER PUBLICATIONS

McMillan and Bishop, Plenoptic Modeling: An Image-Based Rendering System, Computer Graphics, SIGGRAPH 95 Proceedings, pp. 39–46, Aug. 1995.

S.E. Chen, QuickTime VR—An Image–Based Approach to Virtual Environment Navigation, Computer Graphics, SIGGRAPH 95 Proceedings, pp. 29–38, 1995.

S.E. Chen and L. Williams, View Interpolation for Image Synthesis, Computer Graphics, SIGGRAPH 93 Proceedings, pp. 279–288, 1993.

Levoy and Hanrahan, Light Field Rendering, Computer Graphics, SIGGRAPH 96 Proceedings, pp. 31–42, 1996.

Gortler, Grzeszczuk, Szeliski, Cohen, The Lumigraph, Computer Graphics, SIGGRAPH 96 Proceedings, pp. 43–54, 1996.

Levoy, Efficient Ray Tracing of Volume Data, ACM Transactions on Graphics, 9(3), pp. 245–261, Jul. 1990.

(List continued on next page.)

*Primary Examiner*—Mark K. Zimmerman
*Assistant Examiner*—Albert K. Lee
*Attorney, Agent, or Firm*—Coudert Brothers

[57] ABSTRACT

Described is a simple and robust method and system for generating new views from arbitrary camera positions without depth information or feature matching, simply by combining and resampling the available images. This technique interprets input images as two-dimensional slices of a four dimensional function—the light field. This function completely characterizes the flow of light through unobstructed space in a static scene with fixed illumination. A sampled representation for light fields allows for both efficient creation and display of inward and outward looking views. Light fields may be created from large arrays of both rendered and digitized image. The latter are acquired with a video camera mounted on a computer-controlled gantry. Once a light field has been created, new views may be constructed in real time by extracting slices in appropriate directions. Also described is a compression system that is able to compress generated light fields by more than a factor of 100:1 with very little loss of fidelity. Issues of antialiasing during creation and resampling during slice extraction are also addressed.

27 Claims, 12 Drawing Sheets

OTHER PUBLICATIONS

Ihm, Park, Lee, Rendering of Spherical Light Fields, Computer Graphics and Applications, IEEE, pp. 59–68, 1997.

Werner, Hersch, Hlavac, Rendering Real–World Objects Using View Interpolation, Computer Vision, IEEE, pp. 957–962, 1995.

Park, Inoue, Arbitrary View Generation from Multiple Cameras, IEEE, pp. 149–152, 1997.

Kutuakos, Shape from the Light Field Boundary, Computer Vision and Pattern Recognition, IEEE, pp. 53–59, 1997.

V. Kurashov, A. Kurashov, Reconstruction of Two–Dimensional Light Intensity Distribution from the Data of Photo–count Experiments, IEEE, pp. 555–558, 1996.

L. Burton, Viewing Complex Scenes with Error–Buffered Light Fields, Virtual Reality Annual International Symposium, IEEE, pp. 113–120, 1998.

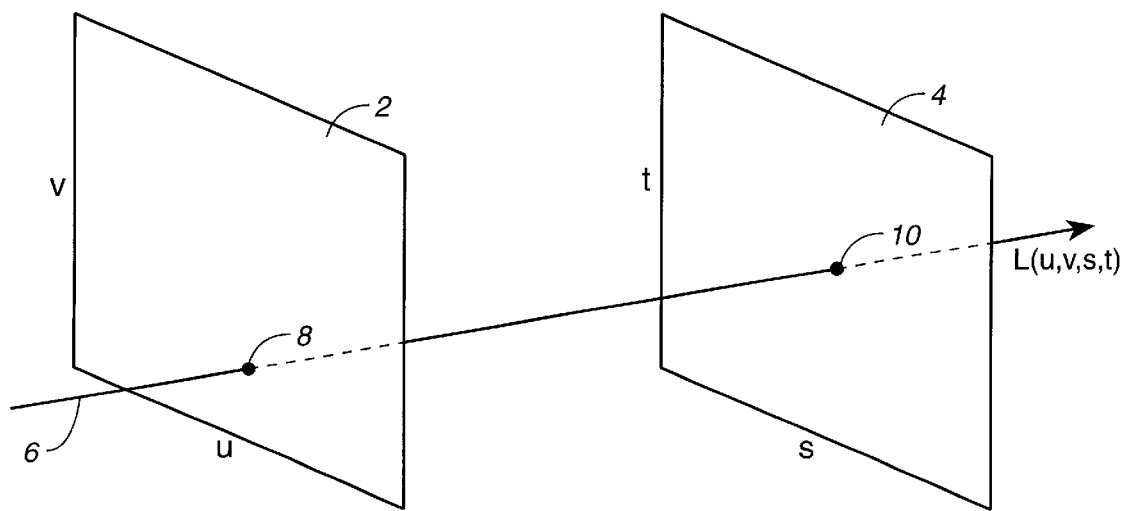
FIG._1
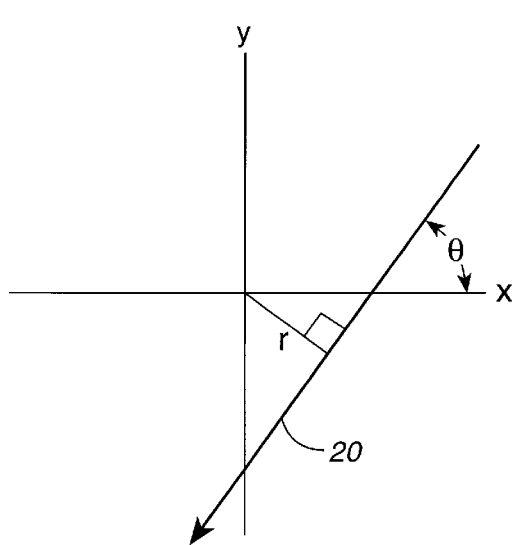
FIG._2A
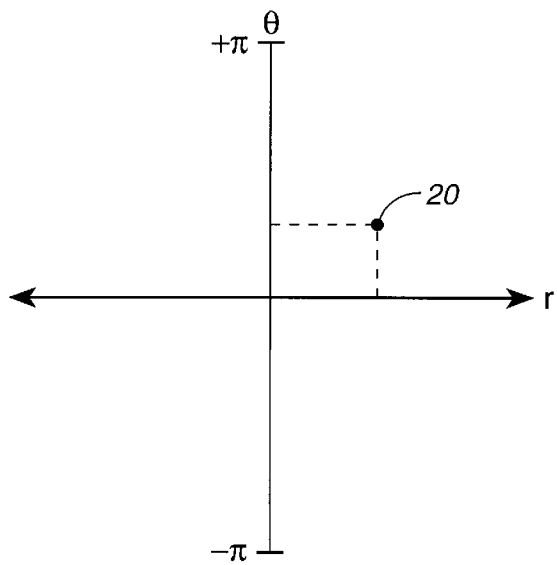
FIG._2B

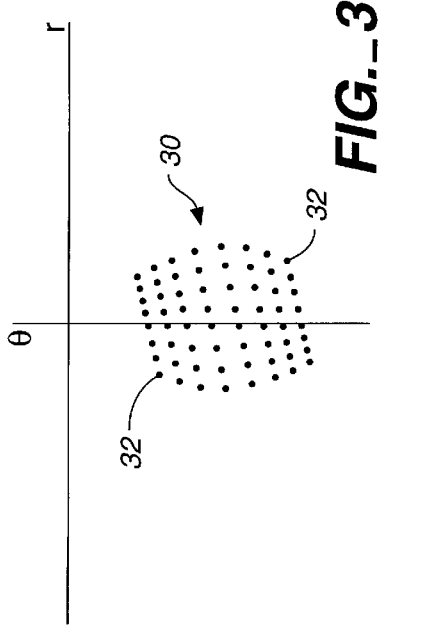
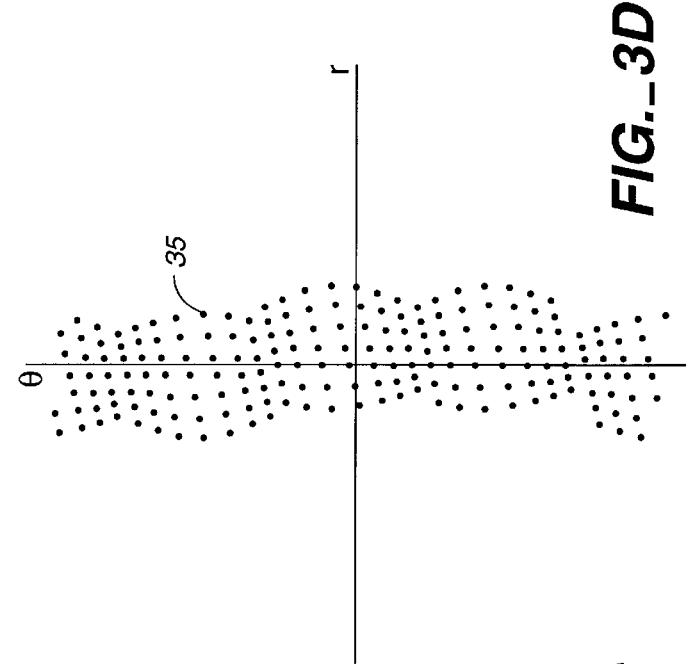
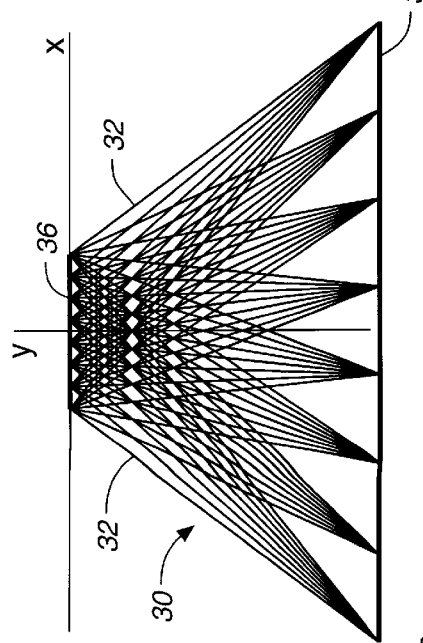
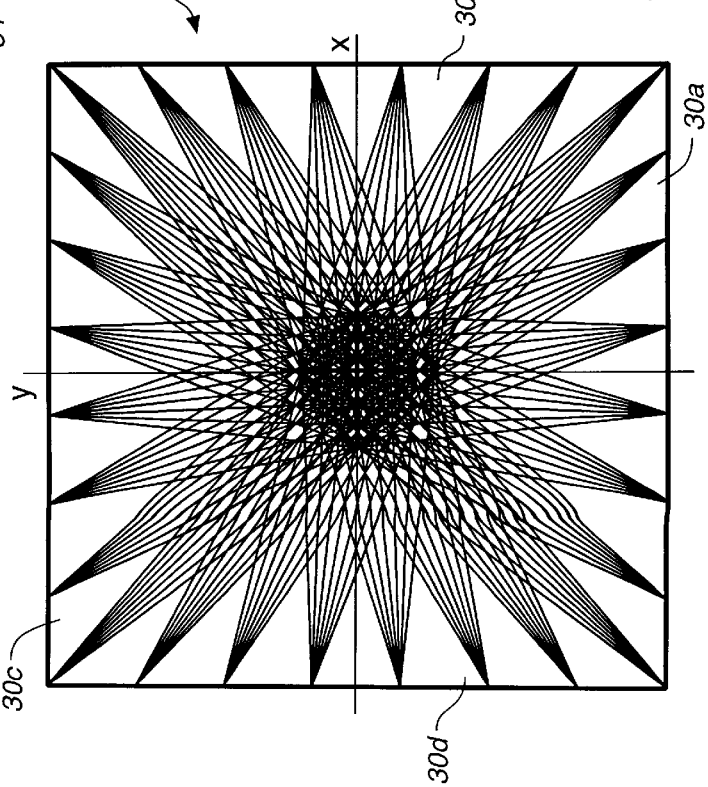

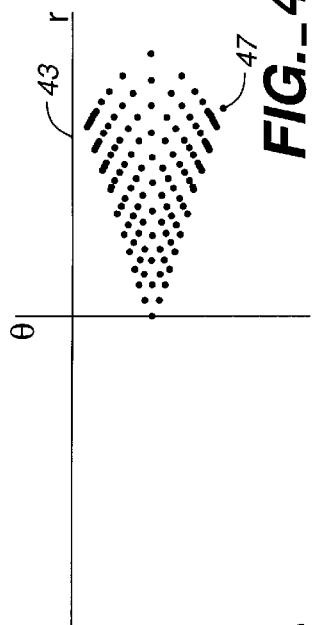
FIG._4B
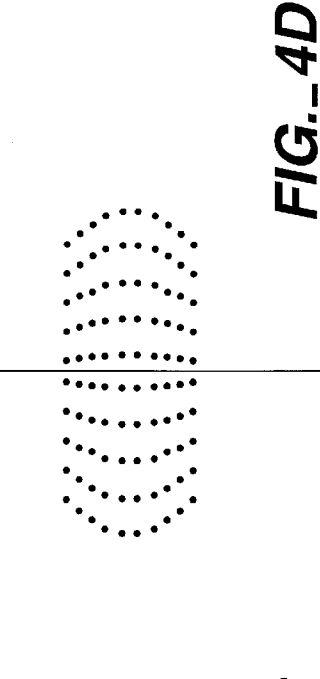
FIG._4D
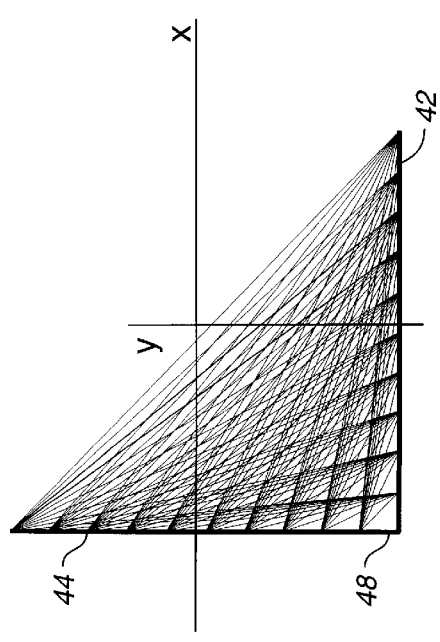
FIG._4A
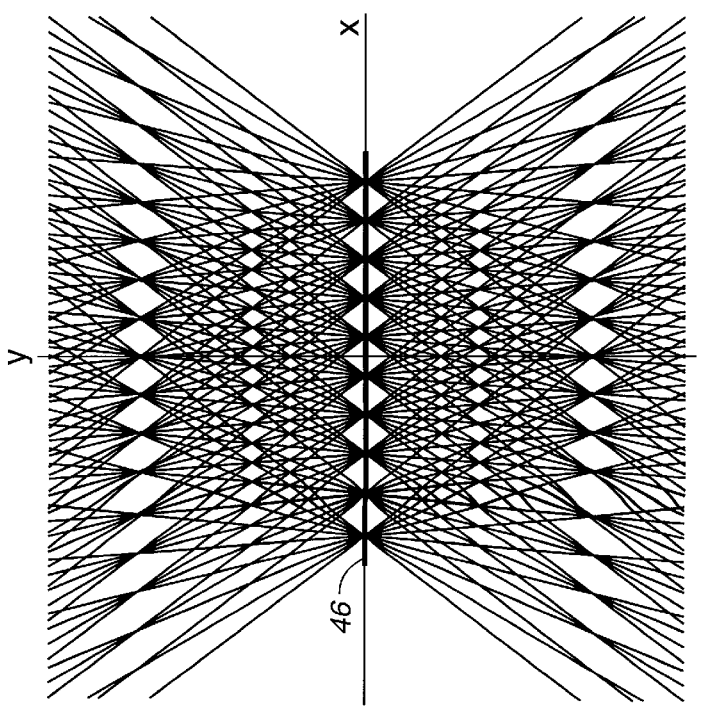
FIG._4C

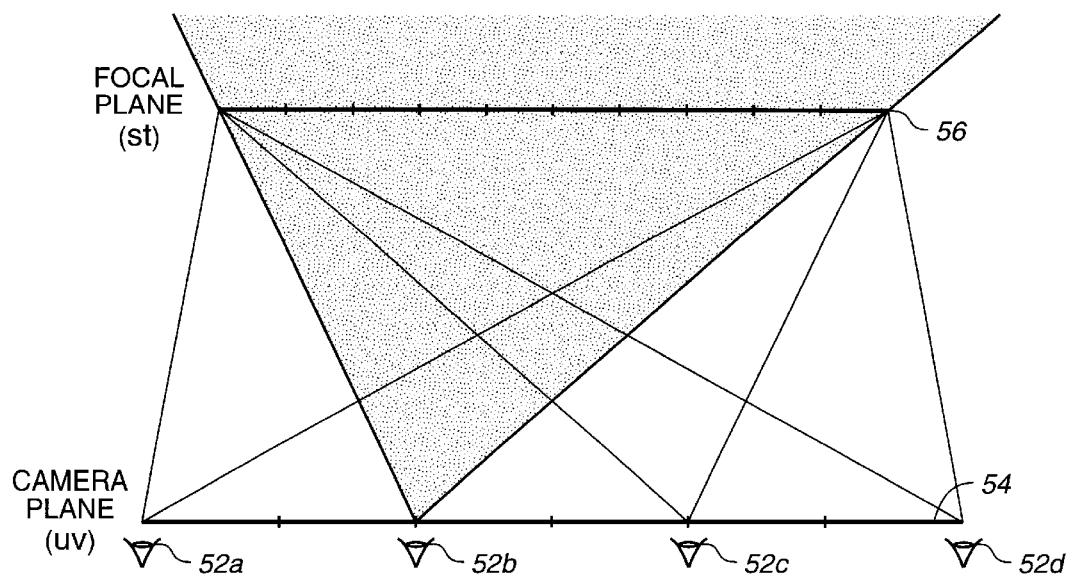
FIG._5
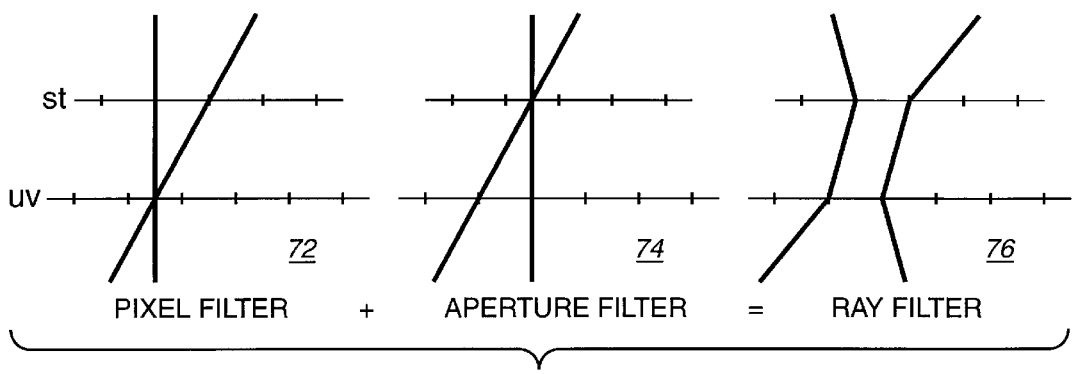
FIG._7

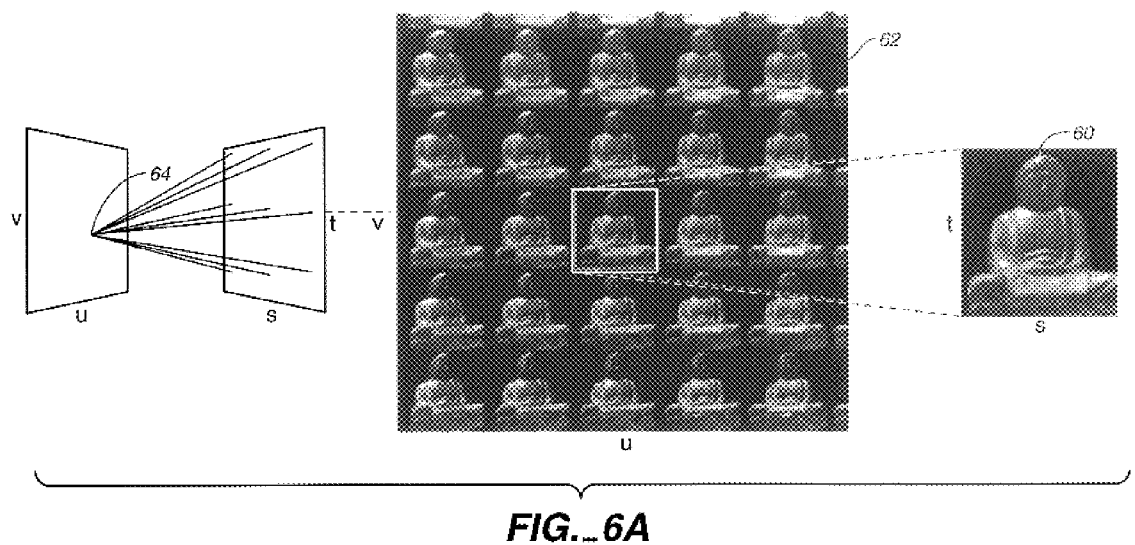
FIG._6A

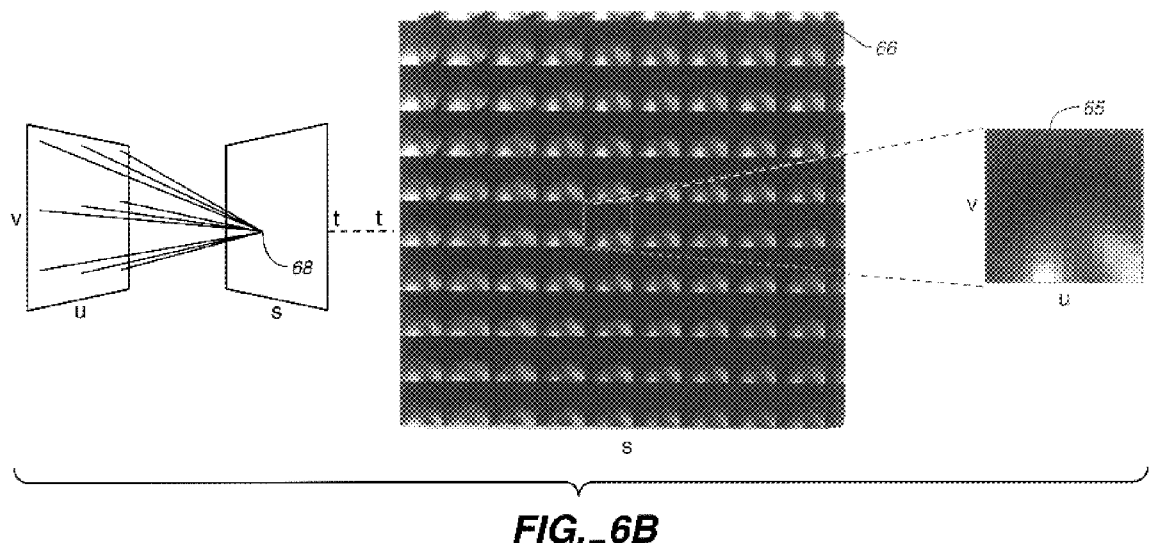
FIG._6B

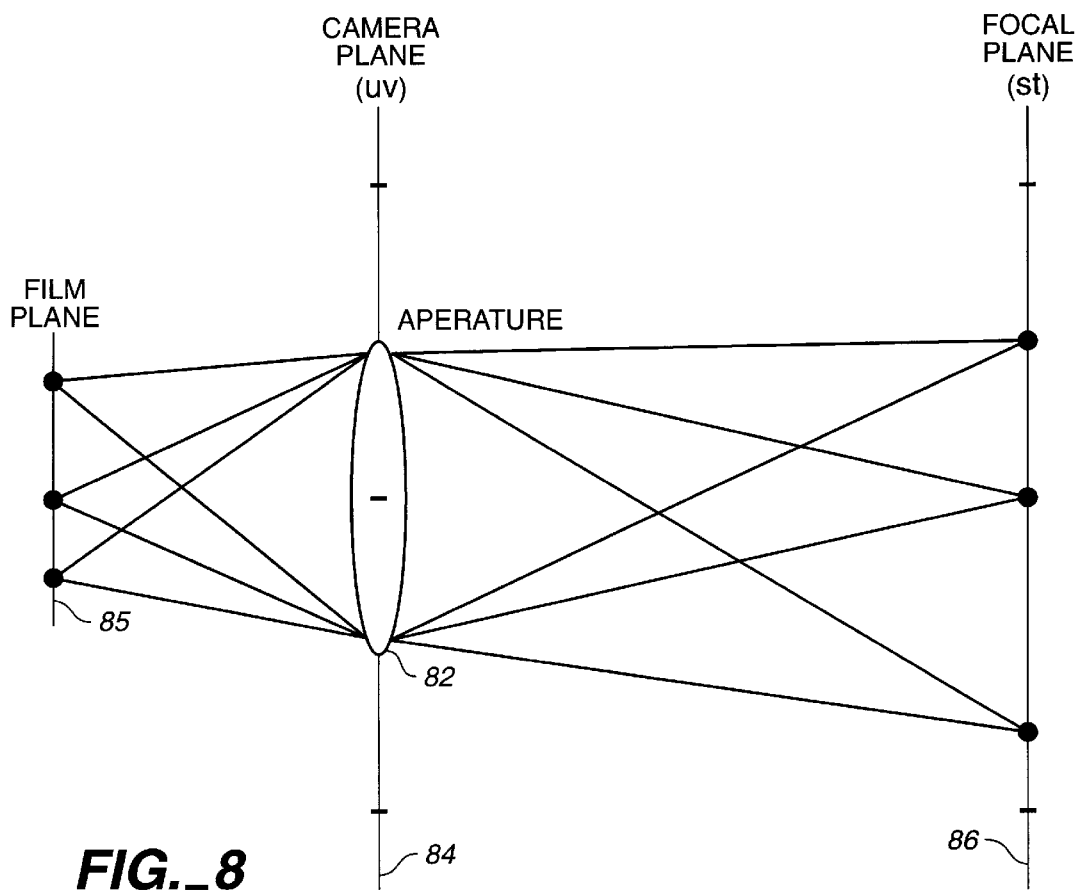
FIG._8
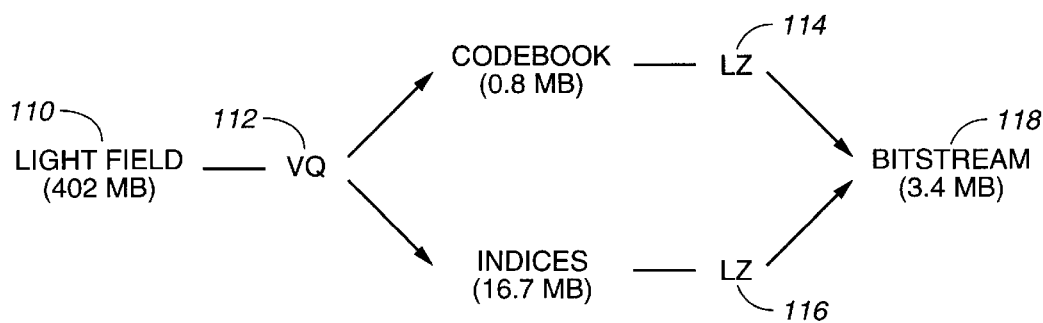
FIG._11

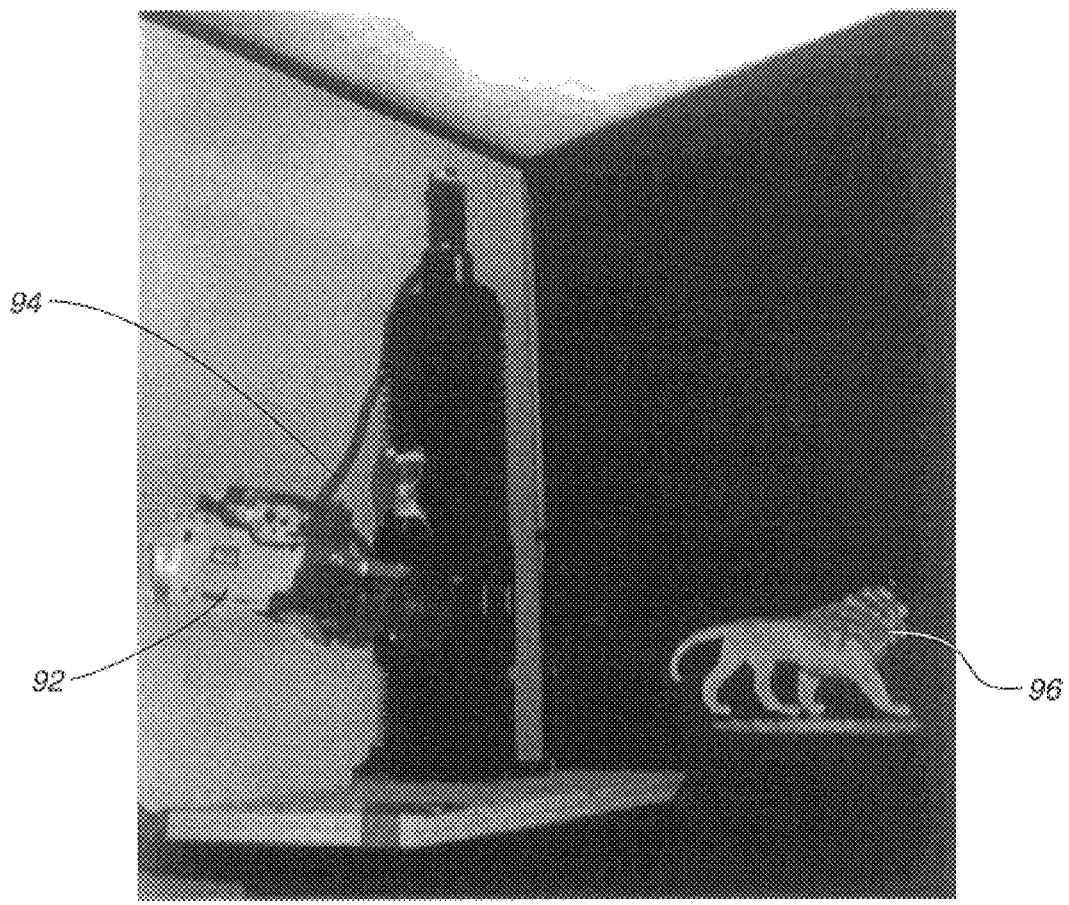
FIG._9
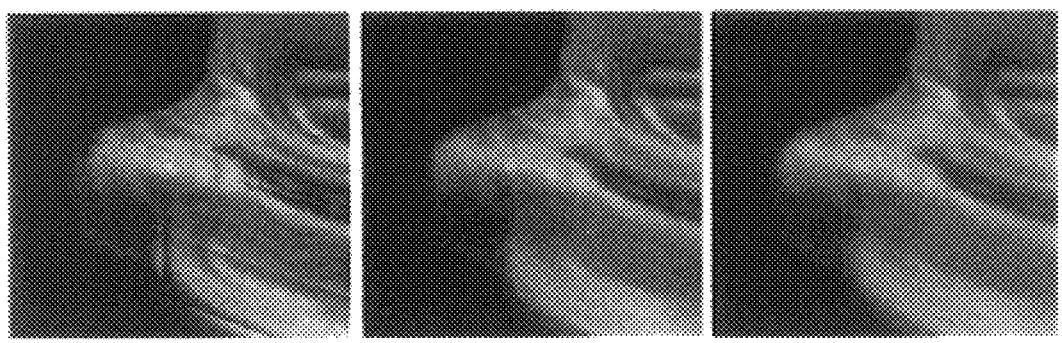
FIG._13A  FIG._13B  FIG._13C

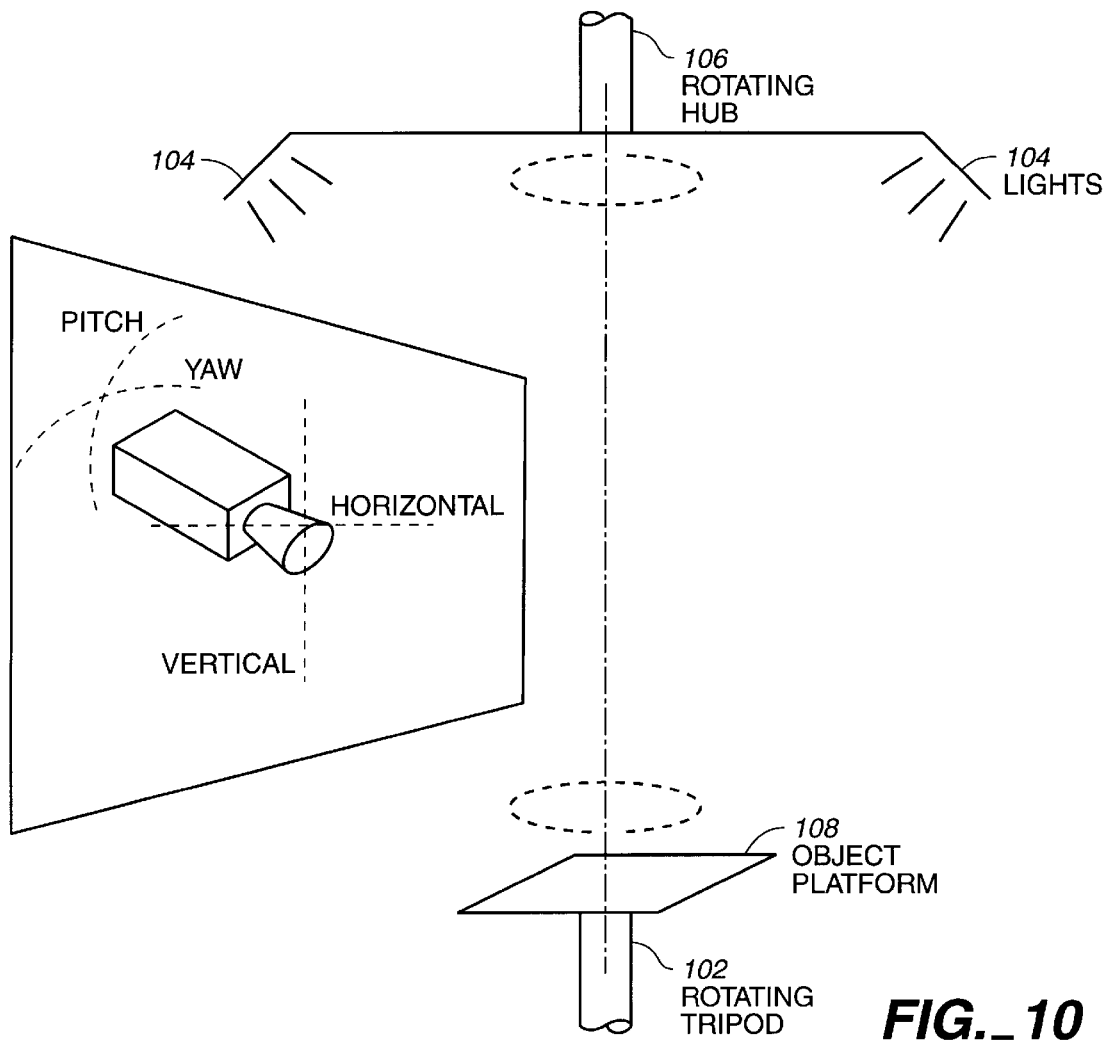
FIG._10
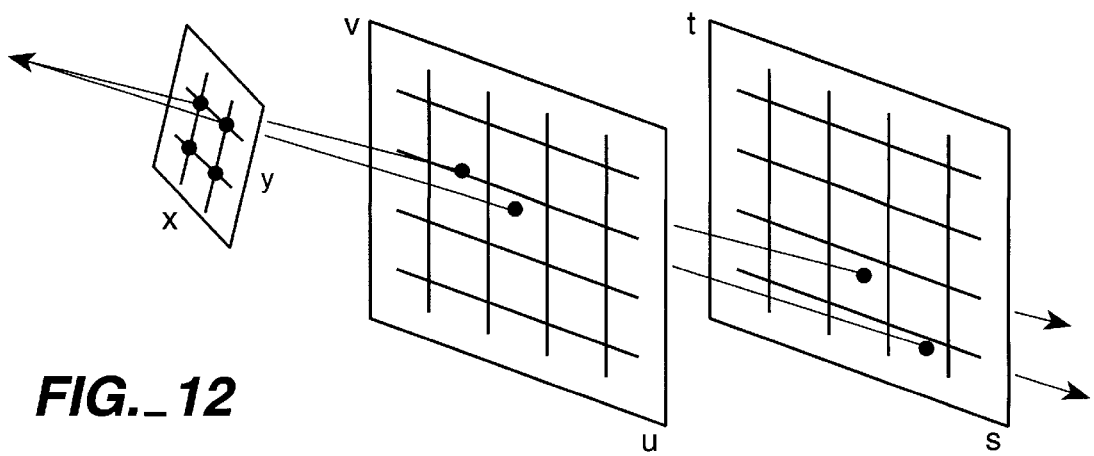
FIG._12

FIG._14A 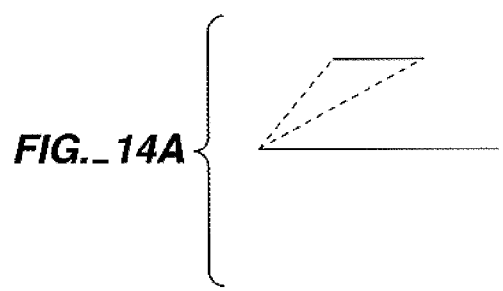 
FIG._14B 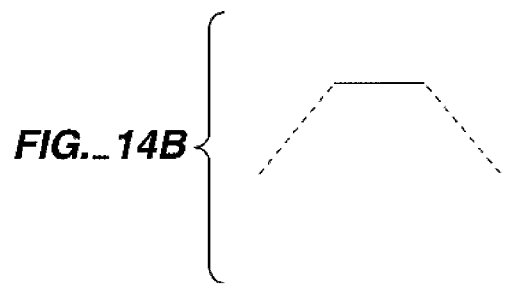 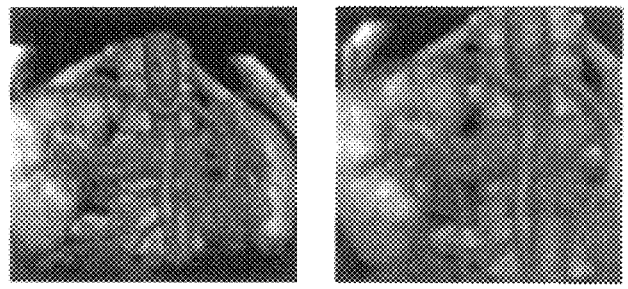

FIG._14C 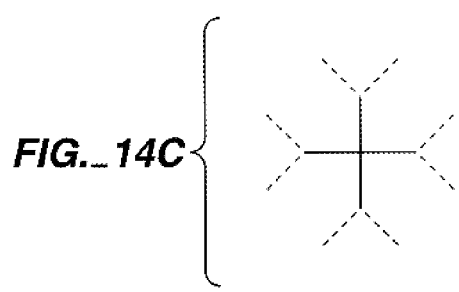 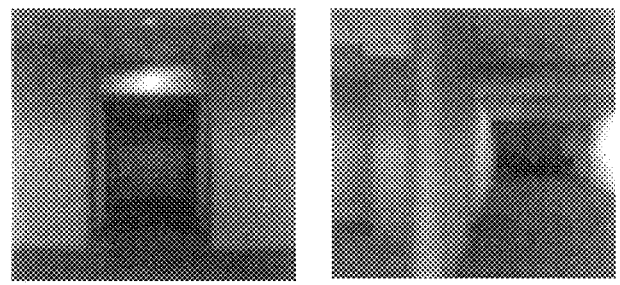
FIG._14D 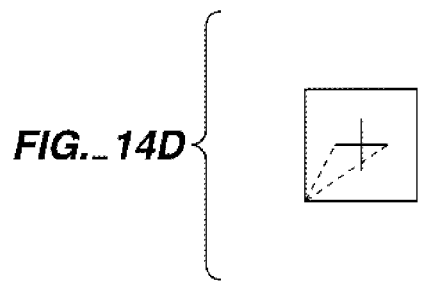 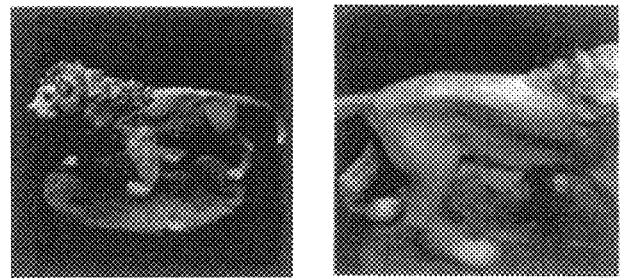

FIG._15A
FIG._15B

METHOD AND SYSTEM FOR LIGHT FIELD RENDERING

This application claims the benefit of U.S. Provisional Application 60/016,511 filed on Apr. 30, 1996.

FIELD OF THE INVENTION

The present invention relates to the field of graphical imaging. More particularly, it relates to a system and method for generating new views of a three-dimensional scene from arbitrary positions without depth information or feature matching, by combining and resampling the available images.

BACKGROUND OF THE INVENTION

Traditionally, the input to a three-dimensional graphics system is a scene consisting of geometric primitives composed of different materials and a set of lights. Based on this input specification, the rendering system computes and outputs an image. Recently, a new approach to rendering has emerged which is known as image-based rendering. Image-based rendering systems generate different views of an environment from a set of pre-acquired imagery.

There are several advantages to the image-based rendering approach. First, the display algorithms for image-based rendering require modest computational resources and are thus suitable for real-time implementation on workstations and personal computers. Second, the cost of interactively viewing the scene is independent of the scene complexity. Even with the best algorithms and fastest hardware, it often takes minutes or hours using existing systems to generate images with the visual richness required for many applications. Third, the source of the pre-acquired images can be from a real or virtual environment (i.e. from digitized photographs or from rendered models), or from a combination of the two.

The forerunner to these techniques is the use of environment maps to capture the incoming light in a texture map. See, e.g., J. F. Blinn & M. E. Newell, "Texture and Reflection in Computer Generated Images," CACM, Vol. 19, No. 10, October 1976, pp. 542–47; N. Greene, "Environment Mapping and Other Applications of World Projections," *IEEE Computer Graphics and Applications*, Vol. 6, No. 11, November 1986, pp. 21–29. An environment map records the incident light arriving from all directions at a point. The original use of environmental maps was to efficiently approximate reflections of the environment on a surface. However, environment maps also may be used to quickly display any outward looking view of the environment from a fixed location but at a variable orientation. For example, this is the basis of the Apple QuickTime VR system. See S. E. Chen, "QuickTime VR—An Image-Based Approach to Virtual Environment Navigation," Proc. SIGGRAPH '95 (Los Angeles, Calif., Aug. 6–11, 1995), *Computer Graphics Proceedings*, Annual Conference Series, 1995, ACM SIGGRAPH, pp. 29–38. In this system environment, maps are created at key locations in the scene. The user is able to navigate discretely from location to location, and while at each location continuously change the viewing direction.

The major limitation of rendering systems based on environment maps is that the viewpoint is fixed. One way to relax this fixed position constraint is to use view interpolation. See S. E. Chen & L. Williams, "View Interpolation for Image Synthesis," Proc. SIGGRAPH '93 (Anaheim, Calif., Aug. 1–6, 1993) *Computer Graphics Proceedings*, Annual Conference Series, 1993, ACM SIGGRAPH, pp. 279–88; N. Green and M. Kass, "Approximating Visibility with Environment Maps, Apple Technical Report no. 41, November 1994; H. Fuchs et al., "Virtual Space Teleconferencing Using a Sea of Cameras," *Proc. First International Conference on Medical Robotics and Computer Assisted Surgery*, 1994, pp. 161–67; L. McMillan & G. Bishop, "Head-Tracked Stereoscopic Display Using Image Warping," *Stereoscopic Displays and Virtual Reality Systems II*, Proc. SPIE, Vol. 240, S. Fisher, J. Merritt, B. Bolas eds. 1995, pp. 21–30; L. McMillan & G. Bishop, Plenoptic Modeling: An Image-Based Rendering System, Proc. SIGGRAPH '95 (Los Angeles, Calif., Aug. 6–11, 1995) *Computer Graphics Proceedings*, Annual Conference Series, 1995, ACM SIGGRAPH, pp. 39–46 (hereinafter "McMillan, Plenoptic Modeling"); P. J. Narayana, "Virtualized Reality: Concepts and Early Results," *Proc. IEEE Workshop on the Representation of Visual Scenes*, IEEE, 1995. Most of these methods require a depth value for each pixel in the environment map, which is easily provided if the environment maps are synthetic images. Given the depth value, it is possible to reproject points in the environment map from different vantage points to warp between multiple images. The key challenge in this warping approach is to "fill in the gaps" when previously occluded areas become visible.

Another approach to interpolating between acquired images is to find corresponding points in the two. See S. Laveau & O. D. Faugeras, "3-D Scene Representation as a Collection of Images and Fundamental Matrices," INRIA Technical Report No. 2205, 1994; McMillan, Plenoptic Modeling"; S. Seitz & C. Dyer, "Physically-Valid View Synthesis by Image Interpolation," *Proc. IEEE Workshop on the Representation of Visual Scenes*, IEEE, 1995. If the positions of the cameras are known, this is equivalent to finding the depth values of the corresponding points. Automatically finding correspondence between pairs of images is the classic problem of stereo vision; unfortunately, although many algorithms exist, these algorithms are fairly fragile and may not always find the correct correspondences.

An abstract representation of light that is related to the present invention is epipolar volumes. See R. Bolles et al, "Epipolar-Plane Image Analysis: An Approach to Determining Structure from Motion," *International Journal of Computer Vision*, Vol. 1, No. 1, 1987, pp. 7–55. An epipolar volume is formed of an array of images created by translating a camera in equal increments in a single direction. Such a representation has been used recently to perform view interpolation. Katayama et al. "Viewpoint-Dependent Stereoscopic Display Using Interpolation of Multiviewpoint Images," *Stereoscopic Displays and Virtual Reality Systems II*, Proc. SPIE, Vol. 2409, S. Fisher, J. Merrit, B. Bolas eds. 1995, pp. 11–20.

Another related representation is the horizontal-parallax-only holographic stereogram. S. Benton, "Survey of Holographic Stereograms," *Processing and Display of Three-Dimensional Data*, Proc. SPIE, Vol. 367, 1983. A holographic stereogram is formed by exposing a piece of film to an array of images captured by a camera moving sideways. Halle has discussed how to set the camera aperture to properly acquire images for holographic stereograms. M. Halle, "Holographic Stereograms as Discrete Imaging Systems," *Practical Holography*, Proc. SPIE, Vol. 2176, Febuary 1994. Gavin Miller has also recognized the potential synergy between true three-dimensional display technologies and computer graphics algorithms. G. Miller, "Volumetric Hyper-Reality: A Computer Graphics Holy Grail for the 21st Century?" *Proc. Graphics Interface '95*, W. Davis and P. Prusinkiewicz eds., Canadian Information Processing Society, 1995, pp. 56–64.

SUMMARY OF THE INVENTION

The primary object of this invention is to provide a technique for displaying three dimensional scenes from previously acquired imagery. A term commonly applied to such techniques is image-based rendering. It is a further object of the invention to provide a new image-based rendering technique which is robust and allows much more freedom in the range of possible views, particular in comparison with the above described techniques.

In fulfillment of these objects and others, our technique utilizes a representation of the "light field," a term used herein to denote the radiance as a function of position and direction in regions of space free of occluders ("free space"). In free space, the light field is a four-dimensional, rather than a five-dimensional function. An image is a two-dimensional slice of the four-dimensional light field. Creating a light field from a set of images corresponds to inserting each two-dimensional slice into the four-dimensional light field representation. Similarly, generating new views corresponds to extracting and resampling a slice.

It will be appreciated by those skilled in the art that generating a new image from a light field is quite different than previous view interpolation approaches. First, the new image is generally formed from many different pieces of the original input images, and need not look like any of them. Second, no model information, such as depth values or image correspondences, is needed to extract the image values. Third, image generation involves only resampling, a simple linear process. Fourth, this impementation may require a large amount of data, mandating some sort of compression.

As described in greater detail below, when the invention is implemented to display three-dimensional scenes on a graphical workstation, it may be necessary to address several issues. First, choice of proper parameterization and representation of the light field is required as is the choice of sampling pattern for the field. Second, one must determine how to generate or acquire the light field. Third, one must address problems related to the fast generation of different views. This requires that a slice representing rays through a point be easily extracted, and that the slice be properly resampled to avoid artifacts in the final image. Fourth, this implementation may require a large amount of data. A preferred technique for addressing these issues is described below.

Additional objects, advantages and novel features of the invention will become more apparent to those skilled in the art upon examination of the following description or may be learned by practice of the invention.

BRIEF DESCRIPTION OF THE DRAWINGS

The accompanying drawings, which are incorporated in and form a part of the specification, illustrate the present invention and, together with the description serve to explain the principles of the invention. In the drawings:

FIG. 1 illustrates a light slab representation.

FIGS. 2A and 2B illustrate the representation of an oriented line in Cartesian space and in line space.

FIGS. 3A to 3D illustrate the use of multiple light slabs to represent various views of an object.

FIGS. 4A to 4D illustrate the density of samples in line space for different arrangements of light slabs.

FIG. 5 illustrates the viewing geometry used to create light slabs from an array of perspective images.

FIGS. 6A and 6B show two visualizations of a light field.

FIG. 7 illustrates a technique for prefiltering a light field.

FIG. 8 illustrates a prefiltering technique using an aperture.

FIG. 9 is a perspective view of a camera gantry used to obtain digitized images in accordance with an embodiment of the invention.

FIG. 10 is a perspective view of an object and lighting support system for digitizing images in accordance with an embodiment of the invention.

FIG. 11 a representation of a two-stage compression pipeline.

FIG. 12 illustrates a technique for resampling a light slab during display in accordance with the invention.

FIGS. 13A–13C illustrates of the effects of interpolation during slice extraction.

FIGS. 14A–14D shows example images from four light fields.

FIGS. 15A–15B shows images extracted from compressed light fields.

DETAILED DESCRIPTION OF THE PREFERRED EMBODIMENT

Using the drawings, the preferred embodiment of the present invention will now be explained. This discussion first describes the representation of a light field. It then describes the creation of light fields from rendered images and from digitized images. A preferred compression technique for use in connection with the invention is then described. A technique for displaying an image from a light slab is then described. Finally, illustrative images are described which were constructed and extracted in accordance with the invention.

A. Representation

As used herein, light field is defined as the radiance at a point in a given direction. This definition is equivalent to the plenoptic function introduced by Adelson and Bergen. See E. H. Adelson & J. R. Bergen, "The Plenoptic Function and the Elements of Early Vision," *Computation Models of Visual Processing*, M. Landy and J. A. Movshon, eds., MIT Press, Cambridge, 1991. The phrase light field was coined by A. Gershun in his paper, "The Light Field," Moscow, 1936, *Journal of Mathematics and Physics*, P. Moon & G. Timoshenko, trans., Vol. XVIII, MIT, 1939, pp. 51–151.

McMillan and Bishop discuss the representation of five-dimensional light fields as a set of panoramic images at different three-dimensional locations. See McMillan, Plenoptic Modeling, supra. However, the five-dimensional representation may be reduced to four-dimensions in free space. This is a consequence of the fact that the radiance does not change along a line unless blocked. Four-dimensional light fields may be interpreted as functions on the space of oriented lines. The redundancy of the five-dimensional representation is undesirable for two reasons: first, redundancy increases the size of the total dataset, and second, redundancy complicates the reconstruction of the radiance function from its samples. This reduction in dimension has been used to simplify the representation of radiation emitted by luminaires. See R. Levin, "Photometric Characteristics of Light Controlling Apparatus," *Illuminating Engineering*, Vol. 66, No. 4, 1971, pp. 205–15; I. Ashdown, "Near-Field Photometry: A New Approach," *Journal of the Illuminating Engineering Society*, Vol. 22, No. 1, Winter 1993, pp. 163–80. Accordingly, the following discussion is directed to four-dimensional light fields.

Although restricting the validity of the representation to free space may seem like a limitation, there are two common situations where this assumption is useful. First, most geometric models are bounded. In this case, free space is the region outside the convex hull of the object, and hence all views of an object from outside its convex hull may be generated from a four-dimensional light field. Second, if one moves through an architectural model or an outdoor scene, one usually moves through a region of free space, and therefore, any view from inside this region of objects outside the region may be generated.

A representation of a four-dimensional light field must be selected to parameterize the space of oriented lines based on several considerations, including: (1) calculation efficiency; (2) control over the set of lines; and (3) uniform sampling. The first consideration requires that the computation of the position of a line from its parameters be fast. More importantly, for the purposes of calculating new views, it should be easy to compute the line parameters given the viewing transformation and a pixel location. The second consideration is based on the realization that while the space of all lines is infinite, only a finite subset of line space is ever needed. For example, in the case of viewing an object we need only lines intersecting the convex hull of the object. Thus, there is an intuitive connection between the actual lines in three-dimensional space and line parameters. The third consideration reflects that given equally spaced samples in line parameter space, the pattern of lines in three-dimensional space should also be uniform. In this sense, a uniform sampling pattern is one where the number of lines in intervals between samples is constant everywhere.

The present invention utilizes a representation which addresses these considerations. According to this representation, lines are parameterized by their intersections with two planes in arbitrary position. As illustrated in FIG. 1, a convention is adopted wherein the coordinate system on a first plane 2 is (u,v) and on a second plane 4 is (s,t). An oriented line 6 is defined by connecting a point 8 on the u-v plane to a point 10 on the s-t plane. In the preferred embodiment u, v, s, and t are restricted to lie between 0 and 1, and thus points on each plane are restricted to lie within a convex quadrilateral. This representation is referred to herein as a "light slab." Intuitively, a light slab represents the beam of light entering one quadrilateral and exiting another quadrilateral.

It is an advantageous feature of this representation that one of the planes may be placed at infinity. This is convenient since it permits lines to be parameterized by two points, or by a point and a direction. The latter proves useful for constructing light fields from orthographic images. Furthermore, if all calculations are performed using homogeneous coordinates, the two cases may be handled at no additional cost in computation.

Another significant advantage of this representation is the efficiency of geometric calculations. Mapping from (u,v) to points on the plane is a projective map and involves only linear algebra (multiplying by a 3×3 matrix). More importantly, as will be discussed below, the inverse mapping from an image (x,y) to (u,v,s,t) is also a projective map. Methods using spherical or cylindrical coordinates require substantially more computation.

FIGS. 2A and 2B use line space to illustrate some of the major concepts of our representation. In these figures, lines are shown in two dimensions to simplify visualization. It will be appreciated that the extension to three dimensions is straightforward.

In FIG. 2A, a line 20 in Cartesian space is shown. As shown in FIG. 2B, the line 20 may be represented in line space by a point. Thus, each oriented line may be represented in line space by a corresponding point. It will be appreciated that many properties of light fields are easier to understand in line space. In line space, each oriented line is represented by a point and each set of lines by a region. In particular, the set of lines represented by a light slab and the set of lines intersecting the convex hull of an object are both regions in line space. All views of an object could be generated from one light slab if its set of lines completely surrounded the set of lines intersecting the convex hull of the object. Unfortunately, this is not possible. Therefore, it takes multiple light slabs to represent all possible views of an object. The system therefore tiles line space with a collection of light slabs.

FIGS. 3A to 3D illustrate the use of multiple light slabs to represent various views of an object. FIG. 3A shows a single light slab 30. Light rays 32 connect points on two defining lines 34 and 36. FIG. 3B shows the corresponding line space visualizations of the light rays shown in FIG. 3A. FIG. 3C shows an arrangement 35 of four rotated copies 30a, 30b, 30c, 30d of the light slab 30 shown in FIG. 3A. FIG. 3D shows the corresponding line space visualizations for each light ray of these rotated copies.

For any set of lines in Cartesian space, the envelope formed by the corresponding points in line space indicates the coverage of position and direction. Ideally, the coverage should be complete in θ and as wide as possible in r. As FIGS. 3A to 3D show, the single slab 30 in FIG. 3A does not provide full coverage in θ, but the four-slab arrangement 35 in FIG. 3C does. The representation of FIG. 3C, however, is narrow in r. Such an arrangement is suitable for inward-looking views of a small object placed at the origin. Illustratively, it was used to generate the light field of the lion object described below in reference to FIG. 14D.

An important issue related to the parameterization is the sampling pattern. Assuming that all views are equally likely to be generated, then any line is equally likely to be needed. Thus all regions of line space should have an equal density of samples. FIGS. 4A to 4D show the density of samples in line space for different arrangements of slabs.

FIG. 4A shows a light slab defined by two lines 42 and 44 at right angles. FIG. 4C shows a light slab where one defining line is at infinity and the other line 46 lies along the x-axis. This arrangement generates rays passing through the defining line 46 with an angle between −45° and +45°. FIG. 4B shows the line space visualization corresponding to the light slab of FIG. 4A. FIG. 4D shows the line space visualization corresponding to the light slab of FIG. 4C.

The use of (r, θ) to parameterize line space has the property that equal areas in line space correspond to equally dense sampling of position and orientation in Cartesian space; ideally the density of points in line space should be uniform. As FIGS. 4A to 4D show, the singularity at the corner 48 in FIG. 4A leads to a highly nonuniform, and, therefore, inefficient sampling pattern, indicated by dark areas 43, 47 in FIG. 4B at angles of 0 and −π/2. The light slab shown in FIG. 4C generates a more uniform set of lines. Although FIG. 4C does not provide full coverage of θ, four rotated copies do. Such an arrangement is suitable for outward-looking views by an observer standing near the origin. For example, this arrangement may be used to generate the hallway light field in FIG. 14C.

The representations shown in FIGS. 3A to 3D and FIGS. 4A to 4D demonstrate that no slab arrangement is perfect. For example, as shown in FIG. 4A, slab arrangements with a singularity, such as two polygons joined at a corner, are bad and should be avoided. In contrast, as shown in FIG. 3A, slabs formed from parallel planes generate fairly uniform patterns. In addition, arrangements like the one shown in FIG. 4C are better than those with two finite plane (such as those shown in FIG. 3A). Finally, because of symmetry, the spacing of samples in u-v should be roughly the same as s-t. If the observer is likely to stand near the u-v plane, then it may be acceptable to sample u-v less frequently than s-t.

B. Creation of Light Fields

The creation of both virtual light fields (from rendered images) and real light fields (from digitized images) are now discussed in reference to FIGS. 5 to 10.

One method to create a light field is to choose a four-dimensional sampling pattern, and for each line sample, find the radiance. This is easily done directly for virtual environments by a ray tracer. In a real environment the preferred approach to generate light fields is to assemble a collection of images of the environment. Alternatively, a spot radiometer may be used, but this approach may be tedious.

1. Creation of Light Fields from Rendered Images

For a virtual environment, a light slab is easily generated simply by rendering a two-dimensional array of images. Each image represents a slice of the four-dimensional light slab at a fixed u-v value and is formed by placing the center of projection of the virtual camera at the location of the sample on the u-v plane. The only issue is that the x-y samples of each image must correspond exactly with the s-t samples. As described below, this is easily done by performing a sheared perspective projection similar to that used to generate a stereo pair of images.

FIG. 5 illustrates the viewing geometry to create a light slab from an array of perspective images. Each perspective is arranged at positions 52a–52d along the camera plane 54, which corresponds to the u-v plane utilizing the convention adopted herein. The focal plane 56 corresponds to the s-t plane.

FIGS. 6A and 6B show the resulting four-dimensional light field utilizing the viewing geometry shown in FIG. 5. This light field can be visualized either as a u-v array of s-t images (FIG. 6A) or as an s-t array of u-v images (FIG. 6B). In FIG. 6A, each image 60 in an array 62 represents the rays arriving at one point 64 on the u-v plane from all points on the s-t plane. In FIG. 6B, each image 65 in array 66 represents the rays leaving one point 68 on the s-t plane bound for all points on the u-v plane. The images in FIG. 6A are off-axis (i.e. sheared) perspective views of the scene, while the images in FIG. 6B look like reflectance maps. The latter occurs because the object has been placed astride the focal plane, making sets of rays leaving points on the focal plane similar in character to sets of rays leaving points on the object.

Alternatively, other viewing geometries are useful. For example, a light slab may be formed from a two-dimensional array of orthographic views. This can be modeled by placing the u-v plane at infinity, as shown in FIG. 4A. In this case, each u-v sample corresponds to the direction of a parallel projection. Again, the only issue is to align the x-y and s-t samples of the image with the s-t quadrilateral.

Another useful geometry consists of a two-dimensional array of outward looking (non-sheared) perspective views with fixed field of view. In this case, each image is a slice of the light slab with the s-t plane at infinity. The fact that all these cases are equally easy to handle with light slabs attests to the elegance of projective geometry. Light fields using each arrangement are described below and illustrated in FIG. 14.

As with any sampling process, sampling a light field may lead to aliasing since typical light fields contain high frequencies. Fortunately, the effects of aliasing may be alleviated by filtering before sampling. In the case of a light field, a four-dimensional filter in the space of lines is employed. Such a filter is shown in FIG. 7 where a ray filter 76 is produced by the combination of a pixel filter 72 and an aperture filter 74.

One possible embodiment employs a box filter. In this case, a weighted average of the radiances on all lines connecting sample squares in the u-v and s-t planes is computed. Light fields are then created from images generated by a camera placed on the u-v plane which is focused on the s-t plane. The filtering process corresponds to integrating both over a pixel corresponding to an s-t sample, and an aperture equal in size to a u-v sample. This technique is described in reference to FIG. 8.

FIG. 8 illustrates a prefiltering technique using an aperture. As shown, a camera focuses on the s-t plane 86. A hypothetical film plane 85 is drawn behind the aperture 82 which is disposed in the u-v plane 84. Ignoring the aperture momentarily (for example, in the case of a pinhole camera that precisely images the s-t plane onto the film plane 85), integration over a pixel on the film plane is then equivalent to integrating over an s-t region bounded by the pixel. Next, considering a fixed point on the film plane while using finite sized aperture (all rays from a point on the film through the aperture are focused on a single point on the focal plane), integration over the aperture 82 corresponds to integrating all rays through the u-v region bounded by the aperture. Therefore, by simultaneously integrating over both the pixel and the aperture, the proper four-dimensional integral is computed. The theory behind this filtering process has been discussed in the context of holographic stereograms by Halle. See M. Halle, "Holographic Stereograms as Discrete Imaging Systems," *Practical Holography*, Proc. SPIE, Vol. 2176, Febuary 1994.

Although prefiltering has the desired effect of antialiasing the light field, it has what at first seems like an undesirable side effect—introducing blurriness due to depth of field. However, this blurriness is precisely correct for the situation described herein. In particular, when creating a pair of images from two adjacent camera locations on the u-v plane, a given object point will project to different locations in these two images. The distance between the two projected locations is called the stereo disparity. Extending this idea to multiple camera locations produces a sequence of images in which the object appears to jump by a distance equal to the disparity. This jumping is aliasing. Taking an image with a finite aperture causes points out of focus to be blurred on the film plane by a circle of confusion. Setting the diameter of the aperture to the spacing between camera locations causes the circle of confusion for each object point to be equal in size to its stereo disparity. This replaces the jumping with a sequence of blurred images. Thus, aliasing is removed by employing finite depth of field.

The necessity for prefiltering can also be understood in line space. Since samples of the light field correspond to points in line space, having a finite depth of field with an aperture equal in size to the u-v sample spacing insures that each sample adequately covers the interval between these line space points. Too small or too large an aperture yields gaps or overlaps in line space coverage, resulting in views that are either aliased or excessively blurry, respectively.

2. Digitized Images

Digitizing the imagery required to build a light field of a physical scene is a formidable engineering problem. The number of images required is large (hundreds or thousands), so the process preferably is automated or at least computer-assisted. Moreover, the lighting must be controlled to insure a static light field, yet flexible enough to properly illuminate the scene, all the while staying clear of the camera to avoid unwanted shadows. Finally, real optical systems impose constraints on angle of view, focal distance, depth of field, and aperture, all of which must be managed. Similar issues have been faced in the construction of devices for performing near-field photometric measurements of luminaries. I. Ashdown, "Near-Field Photometry: A New Approach," *Journal of the Illuminating Engineering Society*, Vol. 22, No. 1, Winter 1993, pp. 163–80. The following discussion describes the issues related to digitizing images and our preferred approach (discussed in reference to FIGS. 9 and 10) for addressing them. Based on this discussion, various other approaches will be apparent to those skilled in the art.

a. Inward Versus Outward Looking

Imagery may be based on either a flyaround of a small object or a flythrough of a large-scale scene. In the embodiment described in this section, the former approach was utilized. Thus, the generated imagery is inward looking. For example, the lion light field of FIG. 14D may be generated with the system shown in FIG. 9.

b. Human Versus Computer-controlled

An inexpensive approach to digitizing light fields is to move a handheld camera through the scene, populating the field from the resulting images. However, this approach necessitates estimating camera pose at each frame and interpolating the light field from scattered data—two challenging problems. As a simplification, the preferred embodiment described herein employs a computer-controlled camera gantry and digitized images on a regular grid. Such a system is shown in FIGS. 9 and 10.

c. Spherical Versus Planar Camera Motion

Many possible camera motions lend themselves to creating the images needed to construct a light field. As examples, we compare two such motions: motion along the surface of a sphere, or motion in a plane. These lead naturally to implementations involving a spherical gantry or a planar gantry, respectively. A spherical gantry has three advantages over a planar gantry: (a) it is easier to cover the entire range of viewing directions; (b) the sampling rate in direction space is more uniform; and (c) the distance between the camera and the object is fixed, providing sharper focus throughout the range of camera motion. On the other hand, a planar gantry has two advantages over a spherical gantry: (a) it is easier to build (the entire structure can be assembled from linear motion stages); and (b) it is closer to the light slab representation described above.

In view of these considerations, the embodiment shown in FIG. 9 employs a planar gantry to obtain images of an object 96. While various components may be utilized, the illustrative embodiment shown includes a modified Cyberware MS motion platform with additional stepping motors which provide four degrees of freedom (horizontal translation, vertical translation, pan and tilt). A Panasonic WV-F300 3-CCD video camera 92 is used with a Canon f/1.7 10–120 mm zoom lens In use, the lens may be locked at its widest setting (10 mm) and mounted so that the pitch and yaw axes pass through the center of projection. While digitizing, the camera 92 is kept pointed at the center of the focal plane. Calibrations and alignments are verified with the aid of a Faro digitizing arm 94 which is accurate to 0.3 mm.

An alternative implementation, in which the camera is moved along the surface of a sphere, might be a gantry design consisting of two concentric hemicycles similar to a gyroscope mounting. Such a gantry has been constructed by Apple Computer to acquire imagery for Quick-Time VR flyarounds. See S.E. Chen, "QuickTime VR—An Image-Based Approach to Virtual Environment Navigation," Proc. SIGGRAPH '95 (Los Angeles, Calif., Aug. 6–11, 1995), *Computer Graphics* Proceedings, Annual Conference Series, 1995, ACM SIGGRAPH pp. 29–38. However, the lighting in the Apple Computer system is attached to the moving camera, rendering it unsuitable for acquiring static light fields.

d. Field of View

Preferably, a light field is built that allows 360 degrees of azimuthal viewing. To accomplish this using a planar gantry involves acquiring four slabs each providing 90 degrees.

The example shown in FIG. 9 achieves this objective with a camera 92 equipped with pan and tilt motors, thereby enabling the use of a narrow-angle lens. The use of a rotating camera means that, in order to transfer the acquired image to the light slab representation it must be reprojected to lie on a common plane. This reprojection is equivalent to keystone correction in architectural photography.

Alternatively, one may use a camera that translates but does not pan or tilt by employing wide-angle optics. However, this solution has two disadvantages. First, wide-angle lenses exhibit significant distortion which must be corrected after acquisition. Second, this solution trades off angle of view against sensor resolution.

Yet another alternative is to employ a view camera in which the sensor and optical system translate in parallel planes, the former moving faster than the latter. For example, horizontal parallax holographic stereograms are constructed using such a camera. See M. Halle, "Holographic Stereograms as Discrete Imaging Systems," *Practical Holography*, Proc. SPIE, vol. 2176, February 1994. However, incorporating such a solution into a gantry that moves both horizontally and vertically may prove difficult.

e. Standoff Distance

A disadvantage of planar gantries is that the distance from the camera to the object changes as the camera translates across the plane, making it difficult to keep the object in focus. The view camera 92 described in reference to FIG. 9 does not suffer from this problem because the ratio of object distance to image distance stays constant as the camera translates. For the rotating camera 92 described in reference to FIG. 9, servo-controlled focusing is an option, but changing the focus of a camera shifts its center of projection and changes the image magnification, complicating acquisition. This problem may be minimized by using strong lighting and a small aperture to maximize depth of field.

f. Sensor Rotation

Each sample in a light slab should represent the integral over a pixel, and these pixels should lie on a common focal plane, as discussed above. A view camera satisfies this constraint because its sensor translates in a plane. The use of a rotating camera means that the focal plane also rotates. However, if the images are resampled carefully during reprojection, the presence of a rotated focal plane will introduce no additional error into the light field. In the preferred embodiment, no artifacts were observed due to such a resampling process.

Aperture Size

Each sample in a light slab should also represent the integral over an aperture equal in size to a u-v sample. In the system shown in FIG. 9, the use of a small aperture produces a light field with little or no u-v antialiasing. Even fully open, the apertures of many commercial video cameras are small. The required antialiasing may be approximated by averaging together some number of adjacent views, thereby creating a synthetic aperture. However, this technique requires a very dense spacing of views, which in turn requires rapid acquisition.

h. Object Support

In order to acquire a 360-degree light field in four 90-degree segments using a planar gantry, either the gantry or the object must be rotated to each of four orientations spaced 90 degrees apart. In view of the size of the gantry illustrated in FIG. 9, the latter technique was adopted in this example. This technique is illustrated in reference to FIG. 10.

FIG. 10 illustrates an object and lighting support. In this example, objects are mounted on a platform 108 attached to a tripod 102, such as a Bogen fluid-head tripod which can be rotated to four orientations spaced 90 degrees apart.

i. Lighting

As illustrated in FIG. 10, a rotating lighting system 104, 106 may be used to satisfy the requirement for fixed illumination. Illumination is provided by lights 104 attached to a ceiling mounted rotating hub 106 that is aligned with the rotational axis of the tripod 102. Illustratively, the lights 104 may comprise two 600W Lowell Omni spotlights. Preferably, a stationary diffuser panel (not shown) is hung between the spotlights and the gantry and the entire apparatus enclosed in black velvet to eliminate any stray light. Alternatively, a lighting system which exhibits fourfold symmetry could also be used.

3. Methodology for Acquiring a Light Field

Utilizing the system described above in reference to FIGS. 9 and 10, it is possible to acquire a light field according to the following procedure. This procedure comprises the following steps. First, for each of four orientations, the camera is translated through a regular grid of camera positions. Next, the camera is panned and tilted at each position to point at the center of the object, along the axis of rotation of the tripod. The image is then acquired, and using standard texture mapping algorithms known in the art, the image is reprojected to lie on a common plane as described above.

Table II, set forth below, provides an illustrative set of acquisition parameters. In that example, the distance between the camera positions (3.125 cm) exceeds the diameter of the aperture (1.25 mm). Accordingly, this example could benefit from denser spacing and a synthetic aperture as noted above.

C. Data Compression

Light field arrays are large, and to make creation, transmission, and display of light fields practical, they preferably should be compressed. Several compression techniques are available. However, we have discovered that the following unique characteristics of light fields are significant in determining a proper compression technique for use in connection with the invention.

First, data coherence is a significant characteristic of light fields with respect to compression. Light fields exhibit coherence in all four dimensions. For example, the smooth regions in FIG. 6A indicate that this light field contains coherence in s and t, and the smooth regions in FIG. 6B indicated that the light field contains coherence in u and v. The former corresponds to our usual notion of interpixel coherence in a perspective view. The latter can be interpreted either as the interframe coherence one expects in a motion sequence or as the smoothness one expects in the bidirectional reflectance distribution function (BRDF) for a diffuse or moderately specular surface. Occlusions introduce discontinuities in both cases.

Second, most compression techniques place some constraint on random access to data. For example, variable bitrate coders may require scanlines, tiles or frames to be decoded at once. More particularly, such coders include variable bitrate vector quantization and the Huffman or arithmetic coders used in JPEG or MPEG. Predictive coding schemes further complicate access because pixels depend on previously decoded pixels, scanlines, or frames. This poses a problem for light fields since the set of samples referenced when extracting an image from a light field are dispersed in memory. As the observer moves, the access patterns change in complex ways. Therefore, a compression technique that supports low-cost random access to individual samples is preferred.

Third, asymmetry is a characteristic which relates to a proper compression technique. Applications of compression can be classified as symmetric or asymmetric depending on the relative time spent encoding versus decoding. In a preferred embodiment of the invention, it is assumed that light fields are assembled and compressed ahead of time, making this an asymmetric application.

Fourth, computational expense is a factor in choice of a compression technique. Preferably, a compression scheme can be decoded without hardware assistance. Although software decoders have been demonstrated for standards like JPEG and MPEG, these implementations consume the full power of a modem microprocessor. In addition to decompression, the display method has additional work to perform as described more particularly below. Therefore, it is preferred that a compression technique be utilized which can be decoded quickly.

In view of these considerations, the preferred embodiment utilizes a two-stage pipeline compression scheme consisting of fixed rate vector quantization followed by entropy coding, such as Lempel-Ziv coding. This technique is illustrated in reference to FIG. 11.

As represented in FIG. 11, a light field 110 is partitioned into tiles, which are encoded using vector quantization (VQ) 112 to form an array of codebook indices. In this example, the codebook 114 and the array of indices 116 are further compressed using Lempel-Ziv (LZ) coding. An output bit stream 118 is then obtained.

In this example, decompression occurs in two stages: entropy decoding as the file is loaded into memory, and dequantization on demand during interactive viewing. Typical file sizes for this example are shown in FIG. 11 beside each stage.

1. Vector Quantization

As noted above, the first stage of the compression pipeline shown in FIG. 11 is vector quantization (for a more complete description of this technique, see A. Gersho et al., *Vector Quantization and Signal Compression*, Kluwer Academic Publishers 1992). Vector quantization is a lossy compression technique wherein a vector of samples is quantized to one of a number of predetermined reproduction vectors. A reproduction vector is called a codeword, and the set of codewords available to encode a source is called the codebook. Codebooks are constructed during a training phase in which the quantizer is asked to find a set of codewords that best approximates a set of sample vectors, called the training set. The quality of a codeword is typically characterized using mean-squared error (MSE) (i.e. the sum over all samples in the vector of the squared difference between the source sample and the codeword sample). Once a codebook has been constructed, encoding consists of partitioning the source into vectors and finding for each vector the closest approximating codeword from the codebook. Decoding consists of looking up indices in the codebook and outputting the codewords found there—a very fast operation. Indeed, decoding speed is one of the primary advantages of vector quantization.

In the preferred embodiment, two-dimensional or four-dimensional tiles of the light field are used, yielding 12-dimensional or 48-dimensional vectors, respectively. The former takes advantage of coherence in s and t only, while the latter takes advantage of coherence in all four dimensions. To maximize image quality, a representative subset of each light field is trained to be compressed, and then the resulting codebook is transmitted along with the codeword index array. Since light fields are large, even after compression, the additional overhead of transmitting a codebook is small, typically less than 20%. By training on a subset rather than the entire light field, the expense of training is reduced.

The output of vector quantization is a sequence of fixed-rate codebook indices. Each index is log N bits where N is the number of codewords in the codebook, so the compression rate of the quantizer is (kl)/(log N) where k is the number of elements per vector (i.e., the dimension), and l is the number of bits per element, usually eight. The preferred system uses 16384-word codebooks, leading to a compression rate for this stage of the pipeline of (48×8)/(log 16384)= 384 bits/14 bits=27:1. To simplify decoding, the preferred system represents each index using an integral number of bytes, which reduces compression slightly, to 24:1.

2. Entropy Coding

The second stage of the compression pipeline shown in FIG. 11 is an entropy coder designed to decrease the cost of representing high-probability code indices. Since objects are typically rendered or photographed against a constant-color background, the array may contain many tiles that occur with high probability. The preferred system employs gzip, an implementation of Lempel-Ziv coding. See J. Ziv & A. Lempel, "A universal algorithm for sequential data compression," *IEEE Transactions on Information Theory*, IT-23:337–343, 1977. In this algorithm, the input stream is partitioned into nonoverlapping blocks while constructing a dictionary of blocks seen thus far. Applying gzip to the array of code indices typically provides an additional 5:1 compression. Thus total compression is 24×5=120:1.

3. Decompression

Decompression occurs in two stages. In the preferred embodiment, the first stage—gzip decoding—is performed as the file is loaded into memory. The output of this stage is a codebook and an array of code indices packed in 16-bit words. Although some efficiency has been lost by this decoding, the light field is still compressed 24:1, and it is now represented in a way that supports random access.

The second stage—dequantization—proceeds as follows. As the observer moves through the scene, the display engine (see below) requests samples of the light field. Each request consists of a (u,v,s,t,) coordinate tuple. For each request, a subscripting calculation is performed to determine which sample tile is being addressed. Each tile corresponds to one quantization vector and is thus represented in the index array by a single entry. Looking this index up in the codebook reveals a vector of sample values. A second subscripting calculation is then performed, providing the offset of the requested sample within the vector. With the aid of precomputed subscripting tables, dequantization can be implemented very efficiently.

D. Display

The final part of the technique according to the invention is a real time viewer that constructs and displays an image from the light slab given the imaging geometry. In this example, the viewer must resample a two-dimensional slice of lines from the four-dimensional light field; each line represents a ray through the eye point and a pixel center as shown in FIG. 12. There are two steps to this process: 1) computing the (u,v,s,t) line parameters for each image ray; and 2) resampling the radiance at those line parameters.

As mentioned previously, a big advantage of the light slab representation is the efficiency of the inverse calculation of the line parameters. Conceptually the (u,v) and (s,t) parameters are calculated by determining the point of intersection of an image ray with each plane. Thus, any ray tracer can easily be adapted to use light slabs. However, a polygonal rendering system also may be used to view a light slab. The transformation from image coordinates (x,y) to both the (u,v) and the (s,t) coordinates is a projective map. Therefore, computing the line coordinates can be done using texture mapping. The uv quadrilateral is drawn using the current viewing transformation, and during scan conversion the (u/w,v/w,w) coordinates at the corners of the quadrilateral are interpolated. The resulting u=uw/w and v=vw/w coordinates at each pixel represent the ray intersection with the uv quadrilateral. A similar procedure is used to generate the (s,t) coordinates by drawing the st quadrilateral. Thus, the inverse transformation from (x,y) to (u,v,s,t) reduces essentially to two texture coordinate calculations per ray. This approach is cheap and can be done in real time, and is supported in many rendering systems, both hardware and software.

Only lines with (u,v) and (s,t) coordinates inside both quadrilaterals are represented in the light slab. Thus, if the texture coordinates for each plane are computed by drawing each quadrilateral one after the other, then only these pixels that have both valid u-v and s-t coordinates should be looked up in the light slab array. Alternatively, the two quadrilaterals may be simultaneously scan converted in their region of overlap to cut down on unnecessary calculations; for example, this technique may be used in a software implementation.

To draw an image of a collection of light slabs, the two quadrilaterals of each light slab are drawn sequentially. If the set of lines in the collection of light slabs do not overlap, then each pixel is drawn only once, resulting in increased efficiency. To further increase efficiency, "back-facing" light slabs are culled.

The second step involves resampling the radiance. The ideal resampling process involves first reconstructing the function from the original samples, and then applying a bandpass filter to the reconstructed function to remove high frequencies that may cause aliasing. The resampling process may be approximated by simply interpolating the four-dimensional function from the nearest samples. This is correct only if the new sampling rate is greater than the original sampling rate, which is usually the case when displaying light fields. However, if the image of the light field is very small, prefiltering is applied. This could easily be done with a four-dimensional variation of the standard midmapping algorithm. See L. Williams, "Pyramidal Parametrics," *Computer Graphics (Proc. Siggraph '83)*, Vol. 17, No. 3, July 1983, pp. 1–11.

FIGS. 13A to 13C show the effect of nearest neighbor versus linear interpolation on the u-v plane versus quadrilinear interpretation of the full 4D function. FIG. 13A shows the results where no interpolation is used. FIG. 13B shows linear interpolation in u-v only. FIG. 13C shows quadrilinear interpolation in u-v-s-t.

Quadrilinear interpolation coupled with the proper prefiltering generates images with few aliasing artifacts. The improvement is particularly dramatic when the object or camera is moving. However, quadralinear filtering is fairly expensive and dominates the running time of the viewer. In many situations, the sampling rates in the u-v and s-t planes may be different, and then the benefits of filtering one plane may be much greater than the other plane.

E. Experimental Results

FIGS. 14A to 14D show images extracted from four light fields. The first is a buddha constructed from rendered images. The model is an irregular polygon mesh constructed from range data. In this example, the input images were generated using RenderMan, which also provided the machinery for computing pixel and aperture antialiasing. The light field configuration was a single slab similar to that shown in FIG. 3A.

A second light field shown in FIG. 14B is a human abdomen constructed from volume renderings. The two tan-colored organs on either side of the spine are the kidneys. In this case, the input images were orthographic views, so a slab with one plane at infinity was employed as shown in FIG. 4C. Because an orthographic image contains rays of constant direction, more input images were generated than in the example shown in FIG. 4A in order to provide the angular range needed for creating perspective views. The images include pixel antialiasing but no aperture antialiasing. However, the dense spacing of input images reduces aperture aliasing artifacts to a minimum.

A third example shown in FIG. 14C is an outward-looking light field depicting a hallway in Berkeley's Soda Hall, rendered using a radiosity program. To allow a full range of observer motion while optimizing sampling uniformity, four slabs were used with one plane at infinity. Thus this example corresponds to a four-slab version of FIG. 4C. The input images were rendered on an SGI RealityEngine, using the accumulation buffer to provide both pixel and aperture antialiasing.

A fourth example shown in FIG. 14D is a light field constructed from digitized images. The scene is of a toy lion, and the light field consists of four slabs as shown in FIG. 3C, allowing the observer to walk completely around the object. The sensor and optical system provide pixel antialiasing, but the aperture diameter was too small to provide correct aperture antialiasing. As a result, the light field exhibits some aliasing, which appears as double images. These artifacts are worst near the head and tail of the lion because of their greater distance from the axis around which the camera rotated.

Table I summarizes the statistics of each light field shown in FIGS. 14A to 14D. Table II provides acquisition parameters for the lion dataset (FIG. 14D). Table III gives the performance of the compression pipeline on two representative datasets. Table IV summarizes the performance of our interactive viewer operating on the lion light field.

In the examples shown, the buddha (FIG. 14A) was compressed using a two-dimensional tiling of the light field, yielding a total compression rate of 45:1. The lion (FIG. 14D) was compressed using a four-dimensional tiling, yielding a higher compression rate of 118:1. During interactive viewing, the compressed buddha is indistinguishable from the original; the compressed lion exhibits some artifacts, but only at high magnifications. Representative images are shown in FIGS. 15A and 15B. Based on other experiments at higher rates, we have found that as a general rule, the artifacts become objectionable only above 200:1.

TABLE I

Statistics of the light fields shown in FIGS. 14A–14D.

|  | buddha | kidney | hallway | lion |
| --- | --- | --- | --- | --- |
| Number of slabs | 1 | 1 | 4 | 4 |
| Images per slab | 16 × 16 | 64 × 64 | 64 × 32 | 32 × 16 |
| Total images | 256 | 4096 | 8192 | 2048 |
| Pixels per image | $256^2$ | $128^2$ | $256^2$ | $256^2$ |
| Raw size (MB) | 256 | 201 | 1608 | 402 |
| Prefiltering | uvst | st only | uvst | st only |

In Table II below, distance to object and camera pan per sample are given at the center of the plane of camera motion. Total acquisition time includes longer gantry movements at the end of each row and manual setup time for each of the four orientations. The aperture diameter is the focal length divided by the F-number.

TABLE II

Acquisition parameters for the lion field.

| Camera motion | |
| --- | --- |
| translation per slab | 100 cm × 50 cm |
| pan and tilt per slab | 90° × 45° |
| number of slabs | 4 slabs 90° apart |
| total pan and tilt | 360° × 45° |
| Sampling density | |
| distance to object | 50 cm |
| camera pan per sample | 3.6° |
| camera translation per sample | 3.125 cm |
| Aperture | |
| focal distance of lens | 10 mm |
| F-number | f/8 |
| aperture diameter | 1.25 mm |
| Acquisition time | |
| time per image | 3 seconds |
| total acquisition time | 4 hours |

Table III describes compression statistics for two light fields. The buddha light field was compressed using two-dimensional tiles of RGB pixels, forming twelve-dimensional vectors. The lion light field was compressed using four-dimensional tiles (two-dimensional tiles of RGB pixels from each of 2×2 adjacent camera positions), forming 48-dimensional vectors. Bytes per codeword index include padding as described above. Peak signal-to-noise ratio (PSNR) is computed as $10 \log_{10}(255^2/\text{MSE})$.

TABLE III

Compression statistics for two light fields.

|  | buddha | lion |
| --- | --- | --- |
| Vector quantization | | |
| raw size (MB) | 50.3 | 402.7 |
| fraction in training set | 5% | 3% |
| samples per tile | 2 × 2 × 1 × 1 | 2 × 2 × 2 × 2 |
| bytes per sample | 3 | 3 |
| vector dimension | 12 | 48 |
| number of codewords | 8192 | 16384 |
| codebook size (MB) | 0.1 | 0.8 |
| bytes per codeword index | 2 | 2 |
| index array size (MB) | 8.4 | 16.8 |
| total size (MB) | 8.5 | 17.6 |
| compression rate | 6:1 | 23:1 |

TABLE III-continued

Compression statistics for two light fields.

|  | buddha | lion |
|---|---|---|
| Entropy coding | | |
| gzipped codebook (MB) | 0.1 | 0.6 |
| gzipped index array (MB) | 1.0 | 2.8 |
| total size (MB) | 1.1 | 3.4 |
| compression due to gzip | 8:1 | 5:1 |
| total compression | 45:1 | 118:1 |
| Compression performance | | |
| training time | 15 mins | 4 hrs |
| encoding time | 1 mins | 8 mins |
| original entropy (bits/pixel) | 4.2 | 2.9 |
| image quality (PSNR) | 36 | 27 |

Table IV indicates the performance of the interactive viewer for the lion field. Displayed images are 192×192 pixels. Sample extraction includes VQ decoding and sample interpolation. Display overhead includes reading a mouse, computing observer position, and copying the images to a frame buffer. Timings are for a software-only implementation on a 250 MHz MIPS 4400 processor. As the table shows, interactive playback rates are achieved for reasonable image sizes. Note that the size of the light field has no effect on playback rate; only the image size matters. Memory size is not an issue because the compressed fields are small.

TABLE IV

Display performance for the lion field.

| Display times (ms) | no bilerp | uv lerp | uvst lerp |
|---|---|---|---|
| coordinate calculation | 13 | 13 | 13 |
| sample extraction | 14 | 59 | 214 |
| overhead | 3 | 3 | 3 |
| total | 30 | 75 | 230 |

F. Conclusion

In fulfillment of the foregoing objects of the invention, we have now described a new light field representation, the light slab, for storing all the radiance values in free space. Both inserting images into the field and extracting new views from the field involve resampling, a simple and robust procedure. In the above described examples, the sampling density must be high to avoid excessive blurriness. This requires rendering or acquiring a large number of images, which may take a long time and consume a lot of memory. However, denser sample spacing leads to greater inter-sample coherence, so the size of the light field is usually manageable after compression. The resulting system is easily implemented on workstations and personal computers, requiring modest amounts of memory and cycles. Thus, this technique is useful for many applications requiring interaction with three-dimensional scenes.

Many modifications and improvements to the specific illustrative examples will be apparent to those skilled in the art. For instance, in the above examples, the observer is restricted to regions of space free of occluders. This limitation can be addressed by stitching together multiple light fields based on a partition of the scene geometry into convex regions. If the light fields are augmented to include Z-depth, the regions need not even be convex.

Moreover, in the foregoing embodiments, the illumination must be fixed. However, if interreflections are ignored, this limitation can be addressed by augmenting light fields to include surface normals and optical properties. To handle interreflections, we might try representing illumination as a superposition of basis functions. In this regard, see J. Nimeroff et al., "Efficient Rendering of Naturally Illuminated Scenes," *Proc. Fifth Eurographics Rendering Workshop*, 1994, pp. 359–73. This would correspond in our case to computing a sum of light fields each lit with a different illumination function.

The inventive technique may be compared with depth-based or correspondence-based view interpolation. In these systems, a three-dimensional model is created to improve quality of the interpolation and hence decrease the number of pre-acquired images. With the present approach, a much larger number of images is acquired. At first, this may seem like a disadvantage. However, because of the three-dimensional structure of the light field, simple compression schemes are able to find and exploit this same three-dimensional structure. With our invention, simple four-dimensional block coding leads to compression rates of over 100:1. Given the success of the compression, a high density compressed light field has an advantage over other approaches because the resampling process is simpler, and no explicit three-dimensional structure must be found or stored.

There are many representations for light used in computer graphics and computer vision, for example, images shadow and environment maps, light sources, radiocity and radiance basis functions, and ray tracing procedures. The present invention suggests that it would be fruitful to study other abstract light representations from first principles. Such reexaminations may in turn lead to further methods for addressing the central problems in these fields, including those identified herein.

Another area of future research suggested by this description is the design of instrumentation for acquisition. For example, a large parallel array of cameras connected to a parallel computer could be built to acquire and compress a light field in real time. In the short term, there are many interesting engineering issues in designing and building gantries to move a small number of cameras and lights to sequentially acquire both inward- and outward-looking light fields. This same instrumentation could lead to breakthroughs in both three-dimensional shape acquisition and reflection measurements. In fact, the interaction of light with any object can be represented as a higher-dimensional interaction matrix; acquiring, compressing, and manipulating such representations are a fruitful area for investigation.

The above-described embodiments of the invention and illustrations thereof are set forth only by way of example. Many modifications and variations beyond those specifically mentioned will be apparent to those skilled in the art without departing from the spirit and scope of the invention.

What is claimed is:

1. A method for creating a new image of a scene, comprising the steps of:

acquiring light field radiance data by collecting an array of planar images of the scene as observed from a first planar (u,v) surface, said planar array of planar images having inter-element coherence;

storing and compressing said acquired light field radiance data;

computing line parameters for image rays originating from the scene which pass through said first planar (u,v) surface and which intercept a second planar (x,y) pixel surface using projective mapping; and calculating the radiance of said image rays intercepting said (x,y) pixel surface by using a subset of said acquired light-field radiance data.

2. The method of claim 1, further comprising the step of:

selectively decompressing a subset of said acquired light-field radiance data to calculate the radiance of said image rays intercepting said second planar (x,y) pixel surface.

3. The method of claim 2, wherein the step of selectively decompressing a subset of said acquired light-field radiance data utilizes a decoding stage wherein a file containing compressed data is loaded into memory and a second dequantization stage is executed for calculating the radiance of image rays.

4. The method of claim 1, wherein the step of storing and compressing said light-field radiance data includes a two-stage pipeline compression scheme.

5. The method of claim 4, wherein the two-stage compression scheme comprises a fixed rate vector quantization step and an entropy coding step.

6. The method of claim 5, wherein the entropy coding step comprises Lempel-Ziv coding.

7. The method of claim 1, wherein light-field radiance data is decompressed as required with the steps of:

gzip decoding as a file is loaded into memory; and dequantization.

8. The method of claim 1, wherein the step of calculating the radiance of said image rays includes reconstructing a four-dimensional plenoptic function for said image rays from the acquired light field data.

9. The method of claim 8, wherein the four-dimensional plenoptic function is approximated by interpolating the four-dimensional function from the subset of images proximate to the intersection of said image rays with said (u,v) plane.

10. A method for creating a new image of a scene at a new viewpoint comprising the steps of:

acquiring light-field radiance data along at least one planar (u,v) surface by collecting an array of planar images directed towards the center of the scene, said array of planar images having inter-element coherence;

storing and compressing said acquired light field radiance data;

selecting a planar pixel element along a new viewpoint plane;

computing line parameters for image rays originating from the scene which pass through said at least one planar (u,v) surface and which intercept said selected pixel element; and calculating the radiance for said image rays intersecting said pixel element by using a subset of said acquired light-field radiance data.

11. The method of claim 10, wherein each said image ray is represented by an intersection between two planes.

12. The method of claim 11, wherein projective mapping is used to map image rays onto the planar surface of said selected pixel element.

13. The method of claim 12, further comprising the step of:

selectively decompressing a subset of said acquired light-field radiance data which is required to calculate the radiance of said image rays intercepting the planar surface of said selected pixel element.

14. The method of claim 12, wherein the step of storing and compressing said light field radiance data includes a two-stage pipeline compression scheme.

15. The method of claim 14, wherein the two-stage compression scheme comprises a fixed rate vector quantization step and an entropy coding step.

16. The method of claim 10, further comprising the step of:

selectively decompressing a subset of said acquired light field radiance data to calculate the radiance of said image rays intercepting said selected pixel element, wherein the step of decompressing includes a decoding stage wherein a file containing compressed data is loaded into memory and a second dequantization stage executed for computing the radiance of said image rays.

17. The method of claim 10, wherein said step of computing the radiance for said image rays comprises a resampling process in which a four-dimensional light field radiance function is approximated by interpolating nearest neighbor images.

18. The method of claim 10, wherein said step of computing the radiance for said image rays comprises reconstructing a four dimensional plenoptic function.

19. A system for creating and displaying new images of a scene comprising:

means for acquiring light field data composed of an array of planar images of the scene along at least one plan a surface, said array of planar images having inter-element coherence;

means for storing and compressing said light-field data;

means for computing image rays intercepting pixels at a new location; and resampling means for calculating the radiance of said image rays using said compressed light field data.

20. The system of claim 19 wherein said means for acquiring light field data comprises a camera and further comprising: a computer controlled gantry to which said camera is mounted.

21. The system of claim 20, further comprising pan and tilt motors for said camera.

22. The system of claim 20, wherein said camera has a wide angle lens.

23. The system of claim 19, further comprising: means for prefiltering the light field data to alleviate aliasing.

24. The system of claim 23, wherein said means for prefiltering the light field comprises at least one of the group consisting of a pixel filter and an aperture filter.

25. The system of claim 19, wherein said means for acquiring light field data comprises a virtual camera.

26. The system of claim 25, further comprising: rendering means to generate the image of said virtual camera.

27. The system of claim 19, further comprising: means for selectively decompressing a subset of said compressed light field data to generate a new image.

* * * * *